(12) United States Patent
Sacco et al.

(10) Patent No.: US 10,665,960 B2
(45) Date of Patent: May 26, 2020

(54) SYSTEM FOR TRANSMISSION AND/OR RECEPTION OF SIGNALS HAVING ELECTROMAGNETIC MODES WITH ORBITAL ANGULAR MOMENTUM, AND DEVICE AND METHOD THEREOF

(71) Applicants: RAI RADIOTELEVISIONE ITALIANA S.P.A., Rome (IT); S.I.SV.EL. SOCIETA'ITALIANA PER LO SVILUPPO DELL'ELETTRONICA S.P.A.

(72) Inventors: Bruno Sacco, Turin (IT); Assunta De Vita, Turin (IT)

(73) Assignees: RAI Radiotelevisione Italiana S.P.A., Rome (IT); S.I.S.V.EL. Societa' Italiana Per Lo Sviluppo Dell'Elettronica S.P.A., (TO) (IT)

( * ) Notice: Subject to any disclaimer, the term of this patent is extended or adjusted under 35 U.S.C. 154(b) by 134 days.

(21) Appl. No.: 15/127,588

(22) PCT Filed: Apr. 17, 2015

(86) PCT No.: PCT/IB2015/052813
§ 371 (c)(1),
(2) Date: Sep. 20, 2016

(87) PCT Pub. No.: WO2015/159264
PCT Pub. Date: Oct. 22, 2015

(65) Prior Publication Data
US 2017/0170574 A1 Jun. 15, 2017

(30) Foreign Application Priority Data
Apr. 17, 2014 (IT) .............................. TO2014A0328

(51) Int. Cl.
*H01Q 3/00* (2006.01)
*H01Q 21/20* (2006.01)
(Continued)

(52) U.S. Cl.
CPC ............. *H01Q 21/205* (2013.01); *H01Q 3/40* (2013.01); *H04B 7/10* (2013.01); *H04L 5/04* (2013.01);
(Continued)

(58) Field of Classification Search
CPC .... H01Q 21/205; H01Q 21/245; H01Q 21/24; H01Q 3/40; H01Q 3/26; H01Q 25/00;
(Continued)

(56) References Cited

U.S. PATENT DOCUMENTS 8,432,884 B1 * 4/2013 Ashrafi ..................... H04L 5/04
370/343
8,811,366 B2 * 8/2014 Ashrafi ..................... H04L 5/04
370/338

(Continued)

FOREIGN PATENT DOCUMENTS

JP H09-36789 A 2/1997
JP H09-245109 A 9/1997
(Continued)

OTHER PUBLICATIONS

Ahmed Mohamed Abdelsalam Ahmed et al., *Downlink Co-Channel Interference Cancellation in Multihop Relay Networks*, Computer Communications, vol. 32, 2009, pp. 1131-1137.
(Continued)

*Primary Examiner* — Chuong P Nguyen
(74) *Attorney, Agent, or Firm* — Workman Nydegger (57) ABSTRACT

A system is described, along with the related device and method, for transmission and/or reception of signals having electromagnetic modes with orbital angular momentum
(Continued)

(OAM), wherein the device is adapted to receive, at its input, electromagnetic signals from at least one transmitter, and is configured to apply a discrete Fourier transform to the electromagnetic signals in order to generate the signals having electromagnetic modes with orbital angular momentum.

22 Claims, 4 Drawing Sheets

(51) Int. Cl.
| | |
|---|---|
| *H04L 5/04* | (2006.01) |
| *H04B 7/10* | (2017.01) |
| *H01Q 3/40* | (2006.01) |
| *H01Q 1/24* | (2006.01) |
| *H01Q 21/06* | (2006.01) |

(52) U.S. Cl.
CPC .............. *H01Q 1/246* (2013.01); *H01Q 21/06* (2013.01); *H01Q 21/20* (2013.01)

(58) Field of Classification Search
CPC . H04Q 25/00; H04L 5/04; H04B 7/10; H04B 14/008
USPC .......................................... 342/361, 368, 372
See application file for complete search history.

(56) References Cited

U.S. PATENT DOCUMENTS

| | | | | |
|---|---|---|---|---|
| 8,917,745 | B2* | 12/2014 | Chen ..................... | H04L 5/0044 370/468 |
| 9,031,151 | B1* | 5/2015 | Harris ................... | H04B 7/0617 375/267 |
| 9,240,917 | B2* | 1/2016 | Chen ...................... | H04L 47/82 |
| 9,240,956 | B2* | 1/2016 | Chen ...................... | H04L 47/82 |
| 9,379,926 | B2* | 6/2016 | Berretta .................. | H04L 27/18 |
| 9,413,448 | B2* | 8/2016 | Ashrafi ................. | H04B 7/0697 |
| 9,712,367 | B2* | 7/2017 | Dutronc .............. | H04L 27/2639 |
| 10,075,321 | B2* | 9/2018 | Dutronc .............. | H04L 27/2697 |
| 10,084,548 | B2* | 9/2018 | Mary ................ | H04L 25/03254 |
| 10,103,799 | B2* | 10/2018 | Luddy ..................... | H04J 11/00 |
| 10,291,300 | B2* | 5/2019 | Willner ............. | H04L 25/03891 |
| 2010/0013696 | A1* | 1/2010 | Schmitt ................... | G01S 7/024 342/54 |
| 2013/0235744 | A1* | 9/2013 | Chen ....................... | H04L 47/82 370/252 |
| 2013/0235885 | A1* | 9/2013 | Chen ..................... | H04L 5/0044 370/468 |
| 2015/0146815 | A1* | 5/2015 | Berretta .................... | H04L 5/04 375/279 |
| 2015/0188660 | A1* | 7/2015 | Byun ................. | H04B 10/2581 398/44 |
| 2015/0372398 | A1* | 12/2015 | Dudorov .............. | H01Q 25/008 342/368 |
| 2016/0111781 | A1* | 4/2016 | Matteoni .............. | G02B 27/286 343/911 R |
| 2016/0277173 | A1* | 9/2016 | Dutronc .................... | H04L 5/04 |
| 2017/0026095 | A1* | 1/2017 | Ashrafi ................ | H04B 7/0456 |
| 2017/0117626 | A1* | 4/2017 | Sajuyigbe ................ | H01Q 3/26 |
| 2017/0117994 | A1* | 4/2017 | Ashrafi ................... | H04J 14/00 |

FOREIGN PATENT DOCUMENTS

| | | | | |
|---|---|---|---|---|
| JP | 2007-282120 A | 10/2007 | | |
| WO | 2012/084039 A1 | 6/2012 | | |
| WO | WO-2012/084039 A1 * | 6/2012 | ............ | H01Q 21/20 |
| WO | 2014/016655 A1 | 1/2014 | | |
| WO | WO2014016655 * | 1/2014 | ............ | H04L 27/18 |

OTHER PUBLICATIONS

B. Thide et al., *Utilization of Photon Orbital Angular Momentum in the Low-Frequency Radio Domain*, Mar. 2, 2009, XP055108309, 4 pages.

Ove Edfors et al., *Is Orbital Angular Momentum (OAM) Based Radio Communication an Unexploited Area?*, IEEE Transaction on Antennas and Propagation, vol. 60, No. 2, Feb. 2012, pp. 1126-1131.

International Search Report and Written Opinion dated Jul. 13, 2015, issued in PCT Application No. PCT/IB2015/052813, filed Apr. 17, 2015.

L. Allen et al., *Orbital Angular Momentum of Light and the Transformation of Laguerre-Gaussian Laser Modes*, Physical Review A, vol. 45, 1992, pp. 8185-8189.

Fabrizio Tamburini et al., *Encoding Many Channels on the Same Frequency Through Radio Vorticity: First Experimental Test*, New Journal of Physics, vol. 14, Issue 3, Mar. 2012, pp. 17.

International Preliminary Report on Patentability dated Oct. 18, 2016, issued in PCT Application No. PCT/IB2015/052813, filed Apr. 17, 2015.

Japanese Office Action dated Feb. 12, 2019, issued in Japanese Application No. 2016-557319.

* cited by examiner

SYSTEM FOR TRANSMISSION AND/OR RECEPTION OF SIGNALS HAVING ELECTROMAGNETIC MODES WITH ORBITAL ANGULAR MOMENTUM, AND DEVICE AND METHOD THEREOF

BACKGROUND OF THE INVENTION

1. Field of the Invention

The present invention relates to a system, and related device and method, for communication of signals having electromagnetic modes with orbital angular momentum, or OAM.

2. Present State of the Art

In recent years, due to the increased use and diffusion of broadband services and the resulting increased demand for spectral resources from wireless communication systems, alternative approaches to information transmission have been the subjects of in-depth analyses and studies, such as, for example, different modulation schemes, spatial diversity techniques with MIMO ("Multiple-Input and Multiple-Output") architectures, and the like.

One of the most recent techniques addresses topologic diversity, because of its potential possibility of improving the spectral efficiency (and hence the capacity) of radio transmissions.

It has been known for more than a century that electromagnetic waves also carry angular momentum in addition to energy and linear momentum. In this regard, two forms of angular momentum exist: the first one, related to electromagnetic field polarization, is defined as Spin Angular Momentum (SAM), while the second one is dependent on the spatial distribution of the electromagnetic field, and is defined as Orbital Angular Momentum (OAM). The spin angular momentum is an intrinsic property of the classic electromagnetic field and of every single photon, and describes the spin characteristics of the rotational degrees of freedom of the electromagnetic field. In free space, however, the spin angular momentum can only take two values, $\sigma=\pm 1$, corresponding to the polarization of the left-handed or right-handed wave, respectively. On the contrary, the electromagnetic orbital angular momentum (OAM) is an extrinsic property of the electromagnetic field and of every single photon, and describes the orbital characteristics of its rotational degrees of freedom. The electromagnetic field phase factor $\exp\{i\alpha\varphi\}$ is associated with OAM, where $\varphi$ is the azimuthal angle around the axis of the wave beam and $\alpha$ is the phase function, which may take any value. For this reason, a wave beam carrying an arbitrary quantity of OAM modes contains a spectrum of discrete integer OAM self-modes which are mutually orthogonal, and hence will propagate independently. In other words, OAM encloses a state space of dimension $N=1, 2, 3, \ldots$, and because of this it can be considered to be an "azimuthal polarization" with many arbitrary states.

With this technique, the signals are transmitted by using different orthogonal states of the orbital angular momentum, providing a virtually infinite number of channels that utilize the same carrier frequency, resulting in increased transmission rate.

The OAM technique did not arouse much interest until 1992, when Allen et al. [L. Allen, M. W. Beijersbergen, R. J. C. Spreeuw, and J. P. Woerdman, "Optical angular momentum of light and the transformation of Laguerre Gauss laser modes," Phys. Rev. A, vol. 45, pp. 8185-8189, 1992] found out that OAM has natural properties of beams with helical phase, and can be generated by converting Hermite-Gauss beams into Laguerre-Gauss beams.

In particular, much attention has been paid to techniques using OAM beams in optical communications, due to the orthogonality of its states: OAM can significantly increase the spectral capacity and efficiency of optical communication systems by encoding the information as orthogonal states and providing a virtually infinite number of channels using the same carrier frequency, or using different OAM states for multiplexing.

However, until then the field of application had mainly concerned optical frequencies, due to the discovery, in laser optics, of experimental techniques for generating, detecting and manipulating photons in pure and well-defined OAM states. Such basic physical properties of electromagnetic fields can be transferred from optics to radio frequencies. In fact, all studies about applications in the radio communication field remained within the frame of optical frequencies for more than ten years. The perspective changed when researchers demonstrated that an array of antennas can generate radio beams with helical wave fronts (meaning that the phase front varies linearly with the azimuthal angle) and OAM modes similar to Laguerre-Gauss laser beams in optics.

In order to generate radio waves with OAM properties, a concentric and uniform circular antenna array (UCA) was used. The antenna elements in the UCA were fed with the same input signal, but a phase delay was applied to each element, so that, after a full revolution, the phase would be incremented by an integer multiple k of $2\pi$. The field intensity diagrams calculated in the near field region were very similar to those obtained in paraxial optics. This study also underlined how the different OAM states in one beam can be decomposed by integrating the complex field vector weighted with $\exp(-jk\varphi)$ along a circle around the beam axis.

Thus, OAM-based radio transmission provides one possible scheme for transmission at the same carrier frequency within the same band. An experiment in the field was conducted by Tamburini et al. [F. Tamburini, E. Mari, A. Sponselli, B. Thidé, A. Bianchini, and F. Romanato, "Encoding many channels on the same frequency through radio vorticity: first experimental test," New J. Phys., Vol. 14, Is. 3, March 2012] in Venice in 2011, proving that it is possible to simultaneously transmit and receive two incoherent radio waves encoded in two different OAM states (l=[0,1]) at the same frequency. For this reason, OAM-based radio wave transmission seems to offer a new opportunity for improved spectral efficiency at connection level, compared to conventional wireless communication techniques.

SUMMARY OF THE INVENTION

It is therefore the object of the present invention to provide a system for transmission and/or reception of signals having electromagnetic modes with orbital angular momentum, and the related device and method, wherein the signal generation and reception processes can be easily implemented, also with passband signals.

In brief, the following will describe a system, a device and a method for transmission and/or reception of signals having electromagnetic modes with orbital angular momentum, wherein the OAM signal generation process takes place through a device, i.e., a modal transformer, which applies a discrete Fourier transform (DFT). In particular, the DFT is implemented through analog components, such as combiners/dividers and phase shifters, which can also be used with high-frequency passband signals. The OAM signals are generated during transmission.

In reception, a similar device according to the invention allows the application of an inverse modal transformation, through the inverse discrete Fourier transform, to the received OAM signals, thereby obtaining as a result the originally transmitted electromagnetic signals.

Said objects are achieved through the system, the device and the method for transmission and/or reception of signals having electromagnetic modes with orbital angular momentum having the features set out in the appended claims, which are an integral part of the present description.

BRIEF DESCRIPTION OF THE DRAWINGS

The invention will now be described in detail in some of its preferred embodiments, which are provided herein by way of non-limiting example, with reference to the annexed drawings, wherein.

DETAILED DESCRIPTION OF THE PREFERRED EMBODIMENTS

Figure 1:
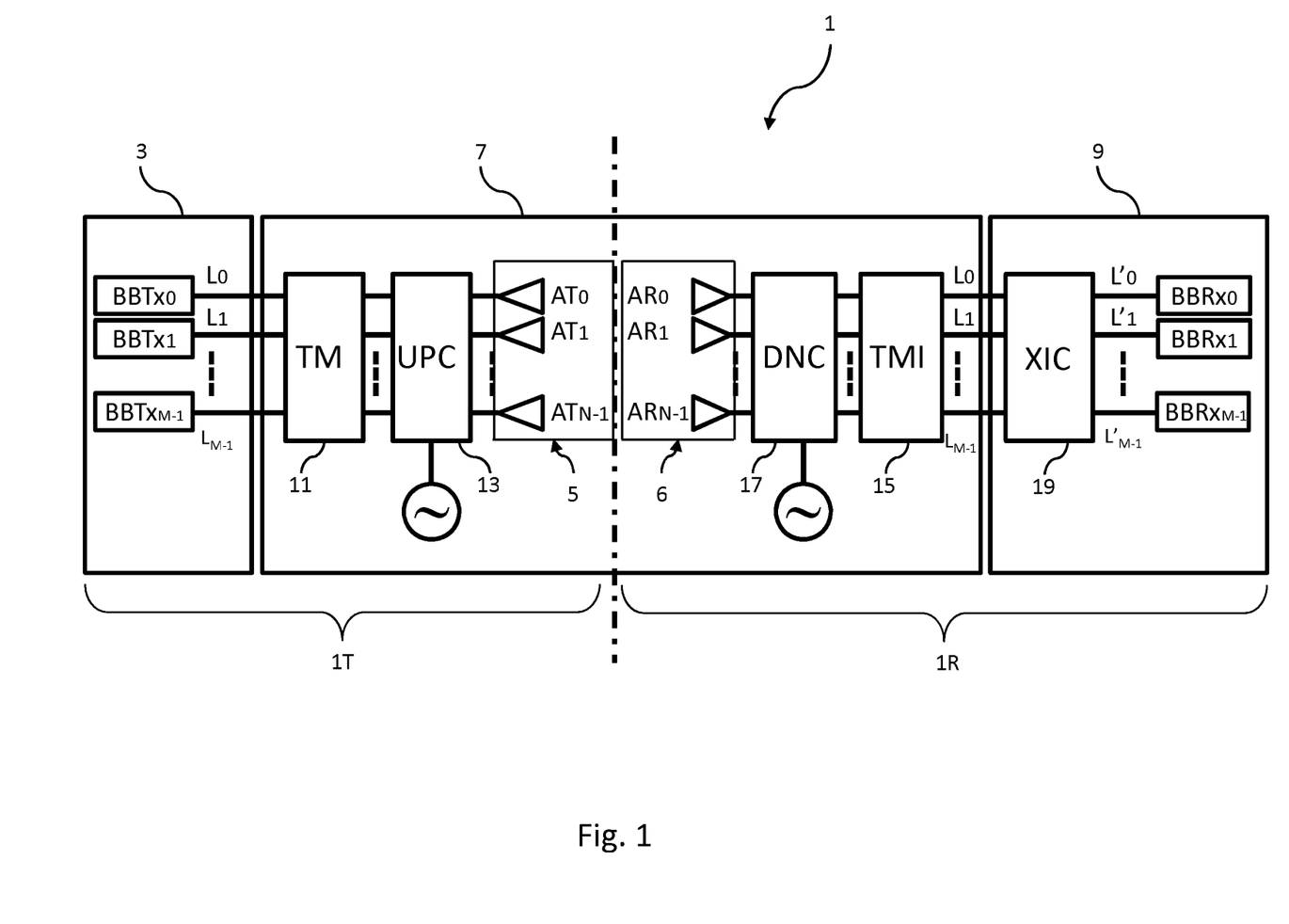
FIG. 1 shows a system according to the present invention.

With reference to FIG. 1, the system (1) for communication of signals having electromagnetic modes with orbital angular momentum (OAM) comprises a system 1T for generation and transmission of said OAM signals and a system 1R for reception of said OAM signals.

The system 1 according to the present invention provides for multiplexing M transmission channels $L_0, L_1, \ldots, L_{M-1}$ (block 3), each one having a bandwidth B, on a single radio channel having a bandwidth C, by using an array of N transmitting antennas 5 and N receiving antennas 6.

In this manner, reuse (M times) of the available radio channel becomes possible even in the absence of multiple propagation paths. In addition, the (vertical, horizontal, circular) polarization of the waves employed constitutes a further degree of freedom that allows further reuse of the channel.

The communication system 1 can be modelled as a block 7 with M inputs and M outputs. Up to M transmitters BBTx0..BBTxM-1 (block 3), each one operating with a known modulation, are connected to said M inputs; the same number M of receivers BBRx0..BBRxM-1 are connected to said M outputs (block 9). In principle, a receiver BBRx0 receives a signal coming from a transmitter BBTx0, a receiver BBRx1 receives a signal coming from a transmitter BBTx1, and so on. However, since the block 7 comprises a radio channel and antennas that might suffer from imperfections and parasitic couplings, the transfer matrix of said block 7 will not be ideal, i.e., diagonal, but there will be mutual interferences among the different signals in the channel. Prior-art MIMO techniques can be used in order to diagonalize the transfer matrix and cancel mutual interferences. For example, "XPIC" ("Cross Polar Interference Canceller") circuits are usually employed in radio links in order to transmit two independent streams on the two polarizations (e.g., vertical and horizontal), thus implementing a 2×2 MIMO technique and doubling the capacity of the communication system. The XPIC canceller estimates the component of the vertical polarization signal that interferes with the horizontal polarization signal, and subtracts it from the latter; the same is done for the other stream.

The N transmitting antennas 5 are arranged equally spaced on a circumference. Such a type of antenna array allows the generation of OAM modes with angular index A, where $-N/2<A<N/2$.

The electromagnetic signals generated by the M baseband transmitters $BBTx_0 \ldots BBTx_{M-1}$ are sent to the M inputs $L_0, L_1, \ldots, L_{M-1}$, each one of which is allocated to a respective OAM mode. The A=0 mode is the one associated with the classic flat wave. According to a typical allocation, the modes with the lowest indices are used first, since they are in any case more robust, followed by modes with progressively higher indices: A=0, 1, −1, 2, −2, and so on.

The mapping between the OAM modes and the M input electromagnetic signals fed to the N transmitting antennas 5 is advantageously carried out through a device 11 according to the invention, i.e., a modal transformer TM 11 that performs a discrete Fourier transform (DFT). For example, let us consider as an input signal a unitary signal at the input with index h (where 0<h<M) of the modal transformer TM 11; it will be transformed by the DFT into a phase ramp of the exp(j2πhk/N) type at the outputs (k being the index of the DFT output). Thanks to the linearity property of the DFT, the mapping can be done simultaneously for all input electromagnetic signals $L_0, L_1, \ldots, L_{M-1}$.

Since $-N/2<A<N/2$, the DFT will map the inputs h=1, ..., (N/2)−1 on positive output phase ramps, and the inputs h=(N/2), ..., (−1) on negative output phase ramps. In particular, with a unitary input h=1 a phase ramp with one cycle per period, i.e., exp(j2πk/N), which will be used for the A=1 mode, will be obtained at the DFT output; with a unitary input h=2 a phase ramp with two cycles per period will be obtained: exp(j2πk/N), which will be used for the A=2 mode; and so on. With a unitary input h=(N−1) a negative phase ramp with one cycle per period will be obtained at the output: exp(−j2πk/N), which will be used for the A=−1 mode; with a unitary input h=N−2 a negative phase ramp with two cycles per period will be obtained at the output: exp(−j2π2 k/N), which will be used for the A=−2 mode; and so on.

For better component efficiency and/or economy, it is possible, in particular, to use a value N which is an integer power of two: if this choice is made, the DFT can be implemented more efficiently through an FFT ("Fast Fourier Transform") algorithm. The main FFT algorithms, referred to as "time decimation" and "frequency decimation" algorithms, utilize naturally arranged inputs and provide outputs with a "bit-reversal" arrangement (bit-reversal permutation), or vice versa: in cases of "bit-reversal" arrangement, the communication system 1 comprises a stream permutation block for obtaining again the natural arrangement.

Downstream of the modal transformer TM 11 there is a first UPC frequency converter 13, i.e., an "Up-Converter". The frequency converter 13 (which is synchronous for all signals) allows obtaining output OAM signals at the frequency of the radio channel in use, i.e., it will convert the OAM signals from baseband into passband. The frequency-converted OAM signals are sent to the N transmitting antennas 5 ($AT_0, AT_1, \ldots, AT_{N-1}$). Such transmitting antennas 5 can be implemented by using any technology, e.g., dipoles, Yagi-Uda, horn, and so on. The directivity of the single antenna AT can be profitably exploited in order to improve the performance of the connection.

As regards the reception system 1R, an array of receiving antennas 6 ($AR_0$, $AR_1$, . . . $AR_{N-1}$) can be used, which is analogous and symmetrical to the transmitting one 5.

An OAM wave with A=h mode (where $-N/2<h<N/2$) is received by the receiving antennas 6 $AR_0$, $AR_1$, . . . , $AR_{N-1}$, at the outputs of which a phase shift of the exp(j2πk/N) type occurs, where k is the index of the receiving antennas 6.

Downstream of the receiving antennas 6 there is a device 15 which is similar to the device 11 according to the invention; however, in this case it is an inverse modal transformer TMI 15, which implements the inverse DFT operation (IDFT), thereby selectively returning, at its outputs $L_0$, $L_1$, . . . , $L_{M-1}$, the electromagnetic signals that were transmitted on each OAM mode. Due to the linearity property of the modal transformer TM 11 and of the inverse modal transformer TMI 15, the system 1 can operate on multiple modes simultaneously.

Thanks to the duality property of the Fourier transform, the same device 11,15 can be used both in transmission and in reception.

Between the receiving antennas 6 and the inverse modal transformer TMI 15 there is a second DNC frequency converter 17 ("Down-Converter"), which is synchronous for all streams, with input at the frequency of the radio channel in use. Said DNC converter 17 allows bringing the received electromagnetic signals back into baseband. The second DNC frequency converter 17 preferably comprises a plurality (M) of frequency converters.

Preferably, between the inverse modal transformer TMI 15 and the M receivers $BBRx_0$..$BBRx_{M-1}$ there is an interference canceller XIC 19, which cancels any mutual interference of the signals in transit therein, i.e., it removes from each signal associated with a certain OAM mode the signals associated with other OAM modes. In other words, the interference canceller XIC 19 performs a function which is similar to the "Cross-Polar Interference Cancellation" technique.

In the system 1, the modal transformer TM 11 and the inverse modal transformer TMI 15 operate on complex baseband signals, typically sampled ones. The architecture of the system 1 can therefore be easily integrated into transmitters and/or receivers created with sampled-data numeric processing techniques.

In a second preferred embodiment of the invention, the positions of the modal transformer TM 11 and of the first UPC frequency converter 13 are reversed, and the same applies in reception to the second DNC frequency converter 17 and the inverse modal transformer TMI 15. In such cases, the modal transformer TM 11 and the inverse modal transformer TMI 15 will operate at the frequency of the selected radio channel, hence with passband signals.

This makes it unnecessary to implement the second DNC frequency converter 17 in complete form.

Figure 2:
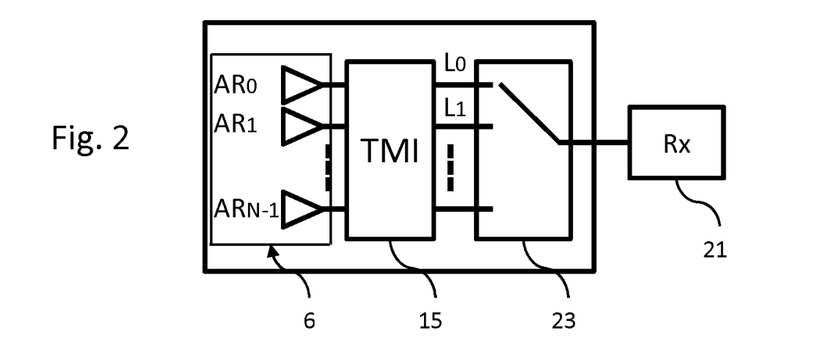
FIG. 2 shows a reception variant of the system according to the present invention.

In fact, with reference to FIG. 2, if the system 1 transmits a multiplicity of signals, but the receiver must only select a part thereof, so that only one receiver at a time actually needs to be used, it will be possible to completely eliminate the second DNC frequency converter 17 (i.e., as aforesaid, containing M frequency converters), replacing it with just a single frequency converter, included in a receiver Rx 21 which will thus operate as a complete radio frequency receiver.

Said receiver Rx 21 can be connected to the inverse modal transformer TMI 15 through a selector 23 allowing selection of the signal coming from the desired h-th OAM mode.

The receiver Rx 21 may therefore be any known receiving apparatus, e.g., a conventional radio-television receiver.

The receiving antennas 6 are advantageously independent of the technology of the receiver Rx 21 and of the type of modulation in use.

Figure 3:
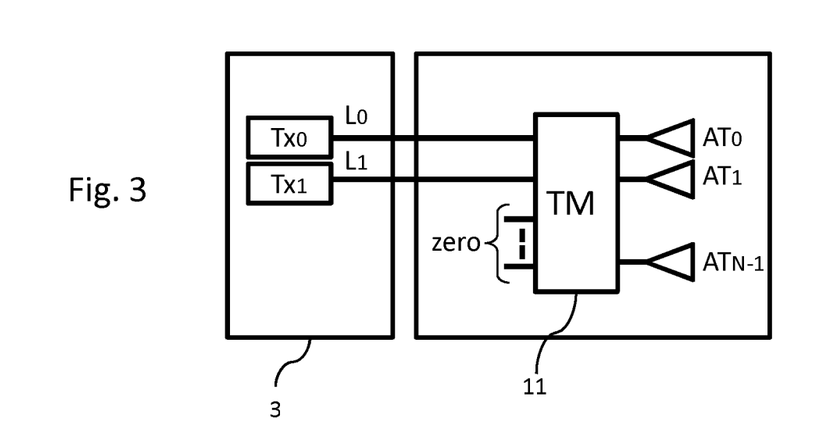
FIG. 3 shows a transmission variant of the system according to the present invention.

Likewise, on the transmission side the first UPC frequency converter 13 can be eliminated, should it not be necessary to use all the transmitters Tx0 . . . TxM-1. With reference to FIG. 3, the unused inputs of the modal transformer TM 11 are fed with a zero signal. FIG. 3 represents the case wherein only two transmitters, Tx0 and Tx1 (block 3) are directly connected to the modal transformer TM 11, and wherein each transmitter Tx0 and Tx1 comprises its own frequency converter ("Up Converter").

The present invention also relates to a device 11 for generating OAM signals, i.e., the modal transformer TM 11 and the inverse modal transformer TMI 15.

Both the modal transformer TM 11 and the inverse modal transformer TMI 15 comprise analog components (stages) arranged in cascade. Synthesis of such stages is obtained by using the sampled baseband data FFT processing methodology. However, in the present invention the synthesis technique is applied within a very different frame, i.e., to analog or anyway passband radio frequency circuits, as opposed to baseband digital signals, and to continuous signals as opposed to sampled signals. Moreover, the FFT is traditionally executed either en bloc or by discrete steps, since digital processors are used. In the present invention, instead, analog signals flow in a continuous stream through the circuits that apply the transform.

The FFT algorithm can be implemented through a series of n stages with n=log 2(N) (where N is the number of inputs), each one of which only consists of complex sums of two operands, and complex products by a pure phase constant.

The present invention preferably implements this property in passband, thereby attaining the useful result that the modal transformer TM 11 and the inverse modal transformer TMI 15 comprise radio frequency combiners/dividers and phase shifters.

This provides a large bandwidth for the modal transformer TM 11 and the inverse modal transformer TMI 15, which will only be limited by the performance of the analog RF components employed. For example, a millimeter wave application may ensure bandwidths of tens of gigahertz, which could not be attained in real time with digital circuits.

Figure 4:
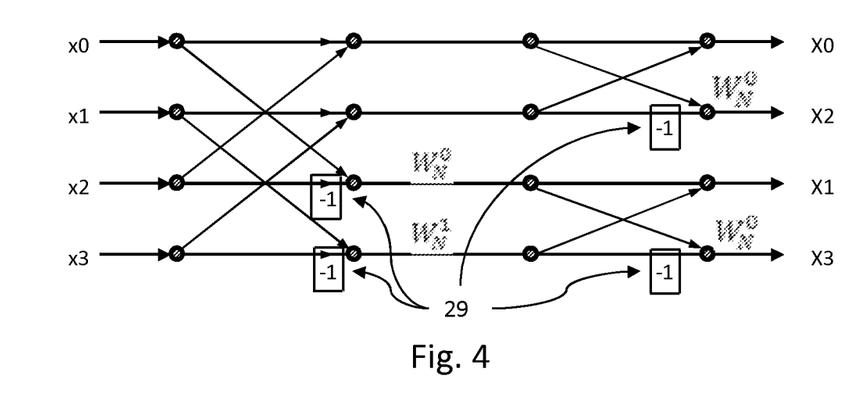
FIG. 4 shows an exemplary flow graph applying the fast Fourier transform.

With reference to FIG. 4, there is shown one example of a flow graph that applies the FFT to 4 input values, x0, x1, x2, x3, and returns four output values X0, X2, X1, X3. Note that the order of the output values is not the natural (original) progressive one, being of the "bit-reversal" type. This FFT is based on log 2(4)=2 stages.

The phase terms are defined as follows: $W_N^r = e^{-j2\pi r/N}$

The index N is the aforementioned number of inputs of the FFT; r is the exponent to which the basic complex exponential $W_N$ is raised in classic "time decimation" and "frequency decimation" FFT algorithms.

Figure 5:
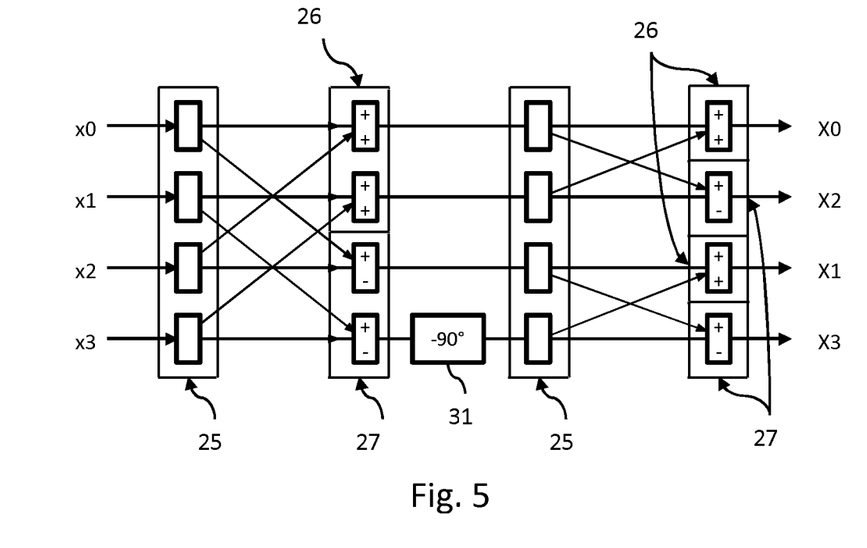
FIG. 5 shows an example of implementation of the device according to the invention, based on the graph of FIG. 4.

With reference to FIG. 5, the flow graph of FIG. 4 is implemented with radio frequency analog components 25,26,27,31. The radio frequency analog components 25,26, 27,31 comprise first nodes 25, from which two branches extend, which are implemented as radio frequency signal dividers 25, and second nodes 26,27, into which two branches are added, which are implemented as radio frequency signal combiners (subtractors 27 or adders 26). The coefficient −1 (reference 29 in FIG. 4) can be implemented, in fact, as a divider 25 having an output with a 180° phase, or as the input of a combiner 26,27 having an input with a 180° phase. The phase term $W_N^0 = e^{-j0}$ can be eliminated, since it represents the multiplication by 1, and therefore the signal will not change. The multiplication by the term $W_N^1 = e^{-j2\pi/N}$ in the case of N=4 is a pure −90° phase shift, and is implemented by means of a radio frequency phase shifter 31 with a −90° phase or, likewise, a +270° phase. The analog radio frequency components 25,26,27,31 comprise, therefore, also the phase shifter 31.

The phase shifter 31 is preferably implemented through a delay line, or is obtained by using an output of a divider 25 configured for obtaining a 90° phase, plus a 180° phase inversion or, respectively, by using the input of a combiner 26,27 configured for obtaining a 90° phase, plus a 180° phase inversion.

Reordering of the output signals having values X0, X2, X1, X3 is attained by connecting the cables of the N transmitting antennas 5 in numerical order, as opposed to the positional order.

Other simplifications are also possible, and will still fall within the scope of the present invention.

Figure 6:
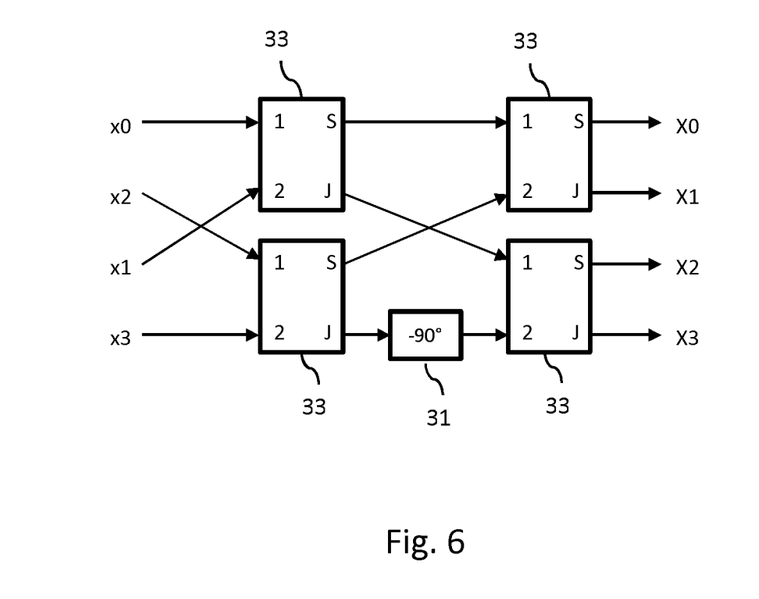
FIG. 6 shows a further example of implementation of the device according to the invention.

With reference to FIG. 6, the following will illustrate a further example of implementation of the device 11,15 according to the invention as shown in FIG. 5.

In the circuit of FIG. 6 a combiner/divider component 33 is introduced, which simultaneously provides the sum (S) and the difference (J) of the signals at the inputs 1 and 2. In this manner, one of these components 33 will replace two dividers 25 and two combiners 26,27 of the circuit of FIG. 5; therefore, four combiner/divider components 33 will replace sixteen of them.

High-frequency dividers 25, combiners 26,27, phase shifters 31 and combiners/dividers 33 can be implemented by using various techniques and circuit solutions, whether passive or active, including transformers, couplers, concentrated-constant artificial lines, and so on. Such techniques and solutions will still fall within the idea of the present invention. By using analog radio frequency components 25,26,27,31,33 in this type of implementations, an advantage is obtained in terms of reciprocity, i.e., they can operate in one direction or in the opposite direction, and, since each FFT algorithm based on time decimation corresponds to an inverse transformation algorithm, which is an algorithm based on frequency decimation, and for each FFT algorithm based on time decimation there is an FFT algorithm based on frequency decimation, which corresponds to exchanging inputs and outputs and inverting the direction of all arrows in the flow graph of FIG. 4, the same analog components 25,26,27,31,33 can be reused (via output rearrangement) in the inverse direction for the IFFT ("Inverse Fast Fourier Transform").

Finally, from an application viewpoint, the system for transmission and/or reception of signals having OAM electromagnetic modes, and the related device and method, of the present invention can also be used, in addition to radio communications, for applications ranging from remote sensing to passive radiometry (e.g., geophysical prospection, spectroscopy for chemical analyses, medical diagnostics, and so on), from radio frequency to microwaves, and more. In fact, although the present invention has been described herein with reference to electromagnetic signals emitted by a transmitter and inputted to the device 11 during transmission, electromagnetic signals may also be received from further emitters, e.g., natural sources to be subjected to passive radiometry.

The features of the present invention, as well as the advantages thereof, are apparent from the above description.

A first advantage of the present invention is that OAM signals are obtained by means of the discrete Fourier transform.

A second advantage of the present invention is that the second DNC frequency converter needs not be implemented in complete form, if the system provides for transmitting a multiplicity of signals and receiving only a part thereof. A further advantage of the present invention is that the receiver Rx may be any prior-art receiving apparatus, in particular a conventional radio-television receiver.

A further advantage of the present invention is that the first UPC frequency converter can be omitted in transmission if there are any unused inputs at the modal transformer TM.

A further advantage of the present invention is that a large bandwidth is obtained for the modal transformer TM and the inverse modal transformer TMI, which is only limited by the performance of the analog radio frequency components in use.

A further advantage of the present invention is that it uses the same analog radio frequency components for executing both the FFT algorithm and the IFFT.

The method for generating and transmitting signals having electromagnetic modes with orbital angular momentum provides for generating said OAM signals through the device 11.

The method for reception of OAM signals provides for receiving the OAM signals through the device 15, applying a inverse discrete Fourier transform to the OAM signals through said device 15, and obtaining at the output of the device 15 the electromagnetic signals that were transmitted by at least one transmitter 3.

The method also provides for applying the discrete Fourier transform and/or the inverse discrete Fourier transform through the analog components 25,26,27,31,33, in particular combiners 26 and 27, dividers 25, phase shifter 31 and combiner/divider components 33.

The system for transmission and/or reception of signals having electromagnetic modes with orbital angular momentum and the related device and method described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to a system for transmission and/or reception of signals having electromagnetic modes with orbital angular momentum and the related device and method, but may be subject to many modifications, improvements or replacements of equivalent parts and elements without departing from the novelty spirit of the inventive idea, as clearly specified in the following claims.

The invention claimed is:

1. A device for generating and transmitting signals having electromagnetic modes with orbital angular momentum, wherein said device is configured to:
   receive, at an input, electromagnetic signals from at least one transmitter;
   generate output signals by applying a Fast Fourier Transform to said electromagnetic signals;

provide said signals to output ports connected to corresponding transmitting antennas; and transmit said output signals such that during transmission, the transmitted output signals have at least one orbital angular momentum due to the application of said Fast Fourier Transform.

2. The device according to claim 1, wherein said device is a modal transformer comprising analog components, including a combiner and/or a divider and/or a phase shifter, configured to implement the Fast Fourier Transform on said electromagnetic signals.

3. The device according to claim 1, wherein said electromagnetic signals occupy substantially a same baseband or passband frequency.

4. The device according to claim 1, wherein a number of said electromagnetic signals received at said input differs from a number of said signals having electromagnetic modes and said different orbital angular momentums produced by said device.

5. The device according to claim 1, wherein said electromagnetic signals are radio-television signals or signals for passive radiometry or remote sensing applications.

6. A system for generating and transmitting signals having electromagnetic modes with orbital angular momentum, or OAM, said system comprising:
at least one electromagnetic signal transmitter;
said device according to claim 1.

7. The system according to claim 6, wherein said system comprises a first frequency converter interposed between said device and said plurality of transmitting antennas, said first frequency converter configured to convert the signals generated by said device from baseband into passband.

8. The system according to claim 6, wherein said system comprises a first frequency converter interposed between said at least one electromagnetic signal transmitter and said device, said first frequency converter configured to convert said signals from baseband into passband.

9. The system according to claim 8, wherein said device operates at a frequency of a selected radio channel with passband signals.

10. A device for receiving signals having electromagnetic modes with different orbital angular momentums, wherein said device is configured to receive said signals having electromagnetic modes with different orbital angular momentums over receiving antennas and apply an inverse Fast Fourier Transform to said signals having electromagnetic modes with different orbital angular momentums in order to obtain, at outputs, electromagnetic signals transmitted by at least one transmitter for being outputted to corresponding receivers.

11. The device according to claim 10, wherein said device is an inverse modal transformer comprising analog components, including a combiner and/or a divider and/or a phase shifter, configured to implement the inverse Fast Fourier Transform on said signals having electromagnetic modes with orbital angular momentum.

12. The device according to claim 10, wherein said electromagnetic signals occupy substantially a same baseband or passband frequency.

13. The device according to claim 10, wherein a number of said received electromagnetic signals with different orbital angular momentums differs from a number of the electromagnetic signals obtained by said device.

14. The device according to claim 10, wherein said electromagnetic signals are radio-television signals or signals for passive radiometry or remote sensing applications.

15. A system for reception of signals having electromagnetic modes with orbital angular momentum, said system comprising:
a plurality of receiving antennas;
said device according to claim 10 receiving said signals having electromagnetic modes with different orbital angular momentums through said plurality of antennas, and
at least one receiver connected to outputs of said device.

16. The system according to claim 15, wherein said system comprises a frequency converter interposed between said device and said at least one receiver, configured to convert into baseband said signals having electromagnetic modes with orbital angular momentum.

17. The system according to claim 15, wherein said system comprises a frequency converter interposed between said plurality of receiving antennas and said device, configured to convert into baseband said signals having electromagnetic modes with orbital angular momentum.

18. The system according to claim 15, further comprising an interference canceller, between said device and said at least one receiver, configured to cancel any mutual interference of said electromagnetic signals in transit therein.

19. A method of generating and transmitting signals having electromagnetic modes with different orbital angular momentums (OAM) in an OAM generation device including a modal transformer and transmitting antennas, wherein said method comprises:
said modal transformer receiving, as input, electromagnetic signals from at least one transmitter;
said modal transformer generating output signals by applying a Fast Fourier Transform to said electromagnetic signals;
said modal transformer providing said output signals to output ports connected to said transmitting antennas; and
said transmitting antennas transmitting said output signals such that during transmission, the transmitted output signals have at least one orbital angular momentum due to the application of said Fast Fourier Transform.

20. The method according to claim 19, wherein the Fast Fourier Transform is applied by means of analog components comprising combiners, dividers, phase shifters and combiner/divider components.

21. A method of processing signals having electromagnetic modes with different orbital angular momentums (OAM) in an OAM receiving device comprising receiving antennas and an inverse modal transformer, wherein said method comprises:
said receiving antennas receiving said signals having electromagnetic modes with different orbital angular momentums and transferring them as input signals to inputs of said inverse modal transformer;
said inverse modal transformer applying an inverse Fast Fourier Transform to said input signals having electromagnetic modes with different orbital angular momentums to obtain output signals;
said inverse modal transformer outputting said output signals to outputs connected to corresponding receivers.

22. The method according to claim 21, wherein the inverse Fast Fourier Transform is applied by means of analog components comprising combiners, dividers, phase shifters and combiner/divider components.

* * * * *